(No Model.)  2 Sheets—Sheet 2.
P. CARDEW.
APPARATUS FOR MEASURING ELECTRIC CURRENTS.
No. 342,777.  Patented June 1, 1886.
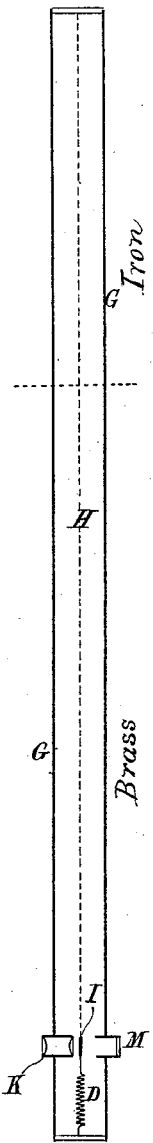
Fig. 5.
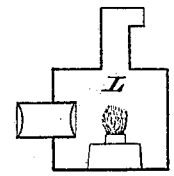
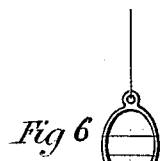
Fig. 7.  Fig 6.
Witnesses.  Inventor.
Philip Cardew
by his Attorneys
Baldwin, Hopkins & Peyton

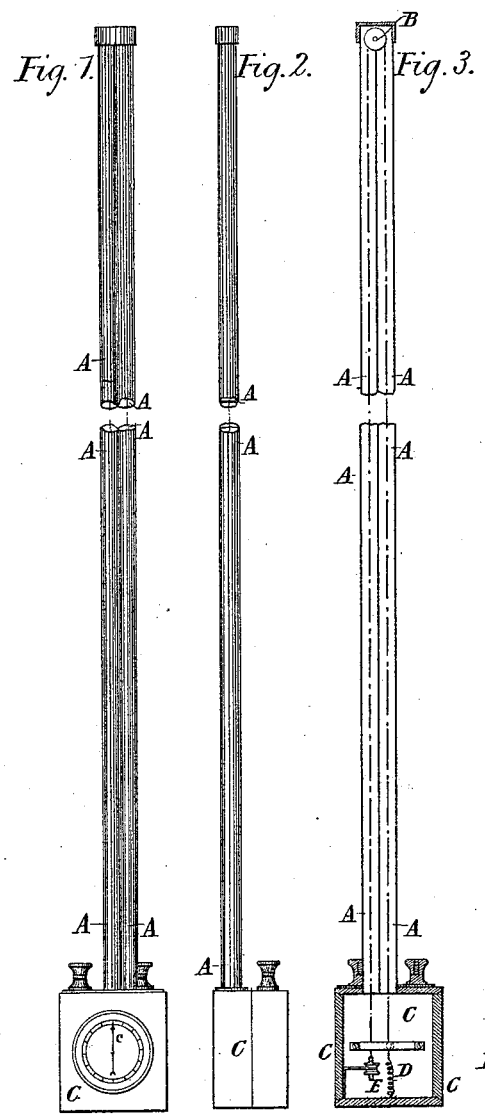

United States Patent Office.

PHILIP CARDEW, OF CHATHAM, COUNTY OF KENT, ENGLAND.

APPARATUS FOR MEASURING ELECTRIC CURRENTS.

SPECIFICATION forming part of Letters Patent No. 342,777, dated June 1, 1886.

Application filed November 24, 1885. Serial No. 183,881. (No model.) Patented in England February 5, 1883, No. 623.

*To all whom it may concern:*

Be it known that I, PHILIP CARDEW, a subject of the Queen of Great Britain, residing at Brompton Barracks, Chatham, in the county of Kent, England, Captain in H. M. Corps of Royal Engineers, have invented certain new and useful Improvements in Apparatus for Measuring Currents of Electricity, (for which I have received Letters Patent in Great Britain, No. 623, dated February 5, 1883,) of which the following is a specification.

This invention has for its object improvements in apparatus for measuring currents of electricity produced from any source, and has special reference to cases where the current or the difference of potential between the two poles producing the current has to be measured. For this purpose I utilize the heating effect of the current on a conductor through which it is passed, this heating producing an extension of the conductor, the amount of which being indicated by suitable apparatus measures the amount of current passing. The conductor is inclosed and supported in a tube of a material of which the coefficient of linear expansion is sensibly the same as that of the conductor. A brass tube is found to answer well when the conductor used is either of German silver or platinum silver, or even of copper; but if the conductor be of iron or steel an iron tube should be used. The conductor is thus supported in order that the reading of the instrument may not be affected by variations in the temperature of the room in which it is placed. The tube may be dispensed with altogether, and a rod of the same metal or of a metal of a similar expansibility used instead, the wire being protected by a casing of wood or similar arrangement; but in all cases it should be arranged so that the material between the upper and lower attachments of the conductor shall be such as to expand and contract for temperature to the same extent as the conductor. The heating effect is produced equally by what are known as "continuous" or "alternating" currents, and the apparatus is equally suitable for use with either. As the amount of heat produced depends on the resistance offered by the conductor, and this resistance varies in all conductors with temperature, those in which this variation is least—as metallic alloys—are preferable. The conductor is so connected with an index-finger that its expansion causes movement of the finger on the face of a dial; or the conductor carries a datum-mark, and by optical arrangements an image of this mark is thrown upon a screen, where its position and movement can be readily observed; or, in some cases, the datum-mark is the filament of a minute incandescent lamp rendered incandescent by the same current as is passing through the wire. The image of this mark is then thrown by the optical apparatus on a photographically-sensitized surface, which may be slowly moved by clock-work. A permanent record is thus obtained.

In order that my said invention may be most fully understood and readily carried into effect, I will proceed to describe the drawings hereunto annexed.

In the drawings, Figure 1 is a front elevation, Fig. 2 is a side elevation, and Fig. 3 is a vertical section, of an instrument constructed in accordance with my invention. Fig. 4 is a detailed view of part of the apparatus. Fig. 5 shows a modification, and Fig. 6 a detail belonging to the same; and Fig. 7 shows a part which may be substituted for Fig. 6, as hereinafter explained.

A A are two metal tubes, which may be of brass, placed side by side, and about three free long. The conductor is preferably a wire of platinum-silver alloy, and .0025 inch in diameter. It passes up one tube over a pulley, B, fitted into the tubes at the top, and down the other tube. The tubes are fixed to a wooden box, C, at the bottom, with a metal dial, C', over which moves an index, $c$, turning on an axle, $c'$. On an enlargement, $c^2$, on this axle is cut a screw-thread of four turns. This axle is pivoted and supported so as to move with great freedom, carrying the index with it. One end of the wire is brought to the center of the screw-thread, and is bent round for two complete turns in the thread. The wire is then soldered in the thread at one point, so as to prevent all possibility of slip. After passing round the screw the end of the wire is fastened to a German-silver or other metallic spiral spring, D, which passes to the bottom of the box and is fixed there. This spring serves to keep the wire stretched, and also to conduct the current from the wire. It should be just strong enough to keep the wire stretched without putting an undue strain on it. The screw-thread should be of such dimensions that the length of wire required for one complete turn of the thread should be about one-fourth inch. The other end of the wire is fixed to a pin, E, in the box, to which a slow motion can be imparted by a screw to allow of correcting the zero. The supports of this pin and the spiral spring are each connected to a terminal, forming the two terminals of the instrument. When the instrument is required to measure higher differences of potential than seventy-five volts, another length of similar wire is inserted in circuit to serve as a resistance, the required length being determined by allowing six feet of .0025 inch diameter platinum-silver wire to seventy-five volts.

Where great accuracy is required, the tubes A are specially corrected to the coefficient of expansion of the conductor, being made for part of their length of brass and the remainder of iron.

In very delicate instruments I substitute a beam of light for a material pointer. I connect with the conductor a small ring with cross-wires or spider-lines strained in it. I form a window in the case on one side, into which I direct the light of a lamp, and on the other side I fix a compound lens, which I adjust to throw an image of the cross wires or lines upon the screen. This arrangment is illustrated by Fig. 5. G is the tube inclosing the thin wire. For two-thirds of its length the tube is of brass and for the remaining third of iron. H is the wire. I is a ring with spider-lines, which is attached to the wire and to the spring D. This ring is represented full size at Fig. 6. K is the object-lens. L is a lamp with lens to illuminate the field around the spider-lines. M is a window by which the light enters. N is a screen on which an image of the spider-lines is thrown.

For a recording-instrument, I substitute for the cross-wires a minute incandescent lamp with a short horizontal filament, and by means of the compound lens I project the image of the filament onto a dry-plate or other sensitive surface slowly moved (if necessary) by clock-work. The plate is afterward developed in the usual way. This form of the instrument resembles that shown by Fig. 5; but the lamp L and window M are dispensed with, and the small incandescent lamp shown by Fig. 7 replaces the ring with spider-lines shown at Fig. 6. The screen G in this case is a dry photographic plate or surface of sensitized paper.

I claim—

1. An instrument for measuring currents of electricity or difference of potential, in which there is a straight conductor maintained in a state of tension and heated by the passage of a current, and appliances for measuring this expansion.

2. An instrument for measuring currents of electricity or difference of potential, in which there is a conductor suitably inclosed and carried by a support having sensibly the same coefficient of expansion, and appliances for measuring the expansion of the conductor when heated by a current.

3. An instrument for measuring currents of electricity or difference of potential, in which there is a conductor suitably inclosed and carried by a support having sensibly the same coefficient of expansion, and connected with an index or pointer indicating the expansion on the face of a dial or scale.

4. An instrument for measuring currents of electricity or difference of potential, in which there is a conductor suitably inclosed and carried by a support having the same coefficient of expansion, and optical apparatus projecting the image of a datum-mark carried by the said conductor on a screen or sensitive surface.

PHILIP CARDEW.

Witnesses:
J. P. OSMAN,
HERBERT E. DALE,
*Both of* 17 *Gracechurch Street, London.*